United States Patent
Harris et al.

(10) Patent No.: US 11,016,750 B2
(45) Date of Patent: May 25, 2021

(54) FIRMWARE UPDATE SYSTEM

(71) Applicant: Microsoft Technology Licensing, LLC, Redmond, WA (US)

(72) Inventors: Shaun L. Harris, Burton, WA (US); John Joseph Siegler, Carnation, WA (US); Banha Sok, Kirkland, WA (US); Rameez Kadar Kazi, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/351,992

(22) Filed: Mar. 13, 2019

(65) Prior Publication Data
US 2020/0293298 A1    Sep. 17, 2020

(51) Int. Cl.
*G06F 8/65* (2018.01)
*G06F 13/42* (2006.01)
*G06F 8/654* (2018.01)

(52) U.S. Cl.
CPC ............ *G06F 8/65* (2013.01); *G06F 13/4282* (2013.01); *G06F 8/654* (2018.02); *G06F 2213/0016* (2013.01)

(58) Field of Classification Search
CPC ............ G06F 8/60–71; G06F 13/4282; G06F 2213/0016
USPC .................................................. 717/168–178
See application file for complete search history.

(56) References Cited

U.S. PATENT DOCUMENTS

| | | | | |
|---|---|---|---|---|
| 7,870,379 | B2 * | 1/2011 | Krieger | G06F 1/26 713/100 |
| 8,782,633 | B1 * | 7/2014 | Tamilarasan | G06F 8/654 717/173 |
| 9,354,864 | B2 * | 5/2016 | Kamrowski | G06F 8/658 |
| 9,430,648 | B2 * | 8/2016 | Jang | G06F 8/654 |
| 10,007,507 | B2 * | 6/2018 | Huang | G06F 8/654 |
| 10,103,940 | B2 * | 10/2018 | Dumet | G06F 8/65 |
| 10,120,702 | B2 * | 11/2018 | Thomas | G06F 9/455 |

(Continued)

FOREIGN PATENT DOCUMENTS

| | | | | |
|---|---|---|---|---|
| CN | 106547592 A | | 3/2017 | |
| CN | 107391186 A | * | 11/2017 | ............ G06F 8/654 |

(Continued)

OTHER PUBLICATIONS

An, J-H., et al., The Design and Development of Integrated Interface for Provision BMC Framework, Proceedings of the 2018 Conference on Research in Adaptive and Convergent Systems, Oct. 2018, pp. 276-278, [retrieved on Jan. 15, 2021], Retrieved from the Internet: <URL:http://dl.acm.org/>.*

(Continued)

*Primary Examiner* — Geoffrey R St Leger
(74) *Attorney, Agent, or Firm* — Buckley, Maschoff & Talwalkar LLC

(57) ABSTRACT

A system includes reception of a first portion of a firmware image, determination, based on the first portion of the firmware image, of whether to update the firmware based on the firmware image, transmission of an acknowledgement signal if it is determined to update the firmware based on the first portion of the firmware image, reception of a remaining portion of the firmware image, and updating of the firmware based on the firmware image.

16 Claims, 7 Drawing Sheets

(56) References Cited

U.S. PATENT DOCUMENTS

| | | | |
|---|---|---|---|
| 10,313,850 B2* | 6/2019 | Kumar | G06F 9/445 |
| 10,394,572 B2* | 8/2019 | Tian | G06F 8/71 |
| 2008/0086652 A1* | 4/2008 | Krieger | G06F 1/26 |
| | | | 713/330 |
| 2009/0228697 A1 | 9/2009 | Kurashige | |
| 2009/0265736 A1* | 10/2009 | Son | H04N 21/435 |
| | | | 725/37 |
| 2009/0282399 A1* | 11/2009 | Kamrowski | G06F 8/658 |
| | | | 717/174 |
| 2014/0208092 A1* | 7/2014 | Huang | G06F 8/654 |
| | | | 713/2 |
| 2015/0134970 A1* | 5/2015 | Jang | G06F 8/654 |
| | | | 713/176 |
| 2016/0142247 A1* | 5/2016 | Dumet | G06F 8/65 |
| | | | 709/221 |
| 2017/0075676 A1* | 3/2017 | Li | G06F 8/65 |
| 2017/0351578 A1* | 12/2017 | Cartes | G06F 11/1435 |
| 2018/0018189 A1* | 1/2018 | Thomas | G06F 9/455 |
| 2018/0024842 A1* | 1/2018 | Tian | G06F 9/452 |
| | | | 455/557 |
| 2019/0028831 A1* | 1/2019 | Kumar | G06F 8/65 |

FOREIGN PATENT DOCUMENTS

| | | | |
|---|---|---|---|
| CN | 107704254 A | * | 2/2018 |
| CN | 107748667 A | * | 3/2018 |

OTHER PUBLICATIONS

Mukherjee, R., et al., Model Checking of Global Power Management Strategies in Software with Temporal Logic Properties, Proceedings of the 6th India Software Engineering Conference, Feb. 2013, pp. 29-34, [retrieved on Jan. 15, 2021], Retrieved from the Internet: <URL:http://dl.acrm.org/>.*

"International Search Report and Written Opinion Issued in PCT Application No. PCT/US20/020578", dated Jun. 25, 2020, 12 Pages.

* cited by examiner

FIRMWARE UPDATE SYSTEM

BACKGROUND

It is occasionally desirable to update the firmware executed by a hardware device of a computing platform. Typically, a master device of the platform receives updated firmware and manages the writing of the updated firmware to an appropriate device of the platform.

According to one conventional example, a management controller writes a firmware image to a firmware memory of a firmware-executing device (e.g., a power supply unit containing one or more microcontrollers). The firmware image may include many thousand lines of code, and writing it to the firmware memory may consume 15-20 minutes. The management controller then reads the written image back from the device, which consumes a similar time period. If the management controller determines that the read image is error-free, the management controller signals the device to initiate an update process. The device then checks the checksum and version of the image and, if the checks are successful, begins updating its firmware based on the image. The foregoing process occupies a significant amount of write cycles and time. These resources are wasted if the receiving device detects an error after the firmware is written thereto and therefore aborts the upgrade.

Prior to writing the firmware image to the firmware memory, the master device asks the slave device to identify a block of memory which is "inactive". Upon receiving a response, the master device then writes the firmware image to the inactive block of memory. Identification of the inactive block consumes time and also requires maintenance of a master/slave communication interface to support the identification process. For example, if the slave device's communication interface changes, then so must the communication interface of all master devices which are intended to manage the slave device.

Moreover, only firmware images which are determined to be compatible with devices of a platform are currently sent to a master device of the platform. The determination is straightforward if the number of possible target devices is small. As datacenters grow in size and complexity, it may become more difficult to determine whether a firmware image is compatible with its intended target prior to sending the firmware image to a platform on which the target resides.

DETAILED DESCRIPTION

The following description is provided to enable any person in the art to make and use the described embodiments. Various modifications, however, will remain readily apparent to those in the art.

Generally, instead of accepting a full firmware image from a platform management controller (which requires tens of minutes) and then determining that the firmware image is not compatible, the slave device receives a small portion of the firmware image from the platform management controller and determines compatibility based on the small portion. The small portion may comprise a header portion within the first line of the firmware image. The update process continues only if the slave device determines that the firmware image is compatible.

Moreover, in some embodiments, the slave device determines the memory location to which the firmware image is written. This determination may eliminate a need for the above-described query by the master device and allow modification of the slave device upgrade architecture without requiring changes to the code base of potential master devices.

Some embodiments may provide further improvement by reducing the number of possible failure points in the upgrade architecture, since the memory management controller acts primarily as a pass-through entity.

Figure 1:
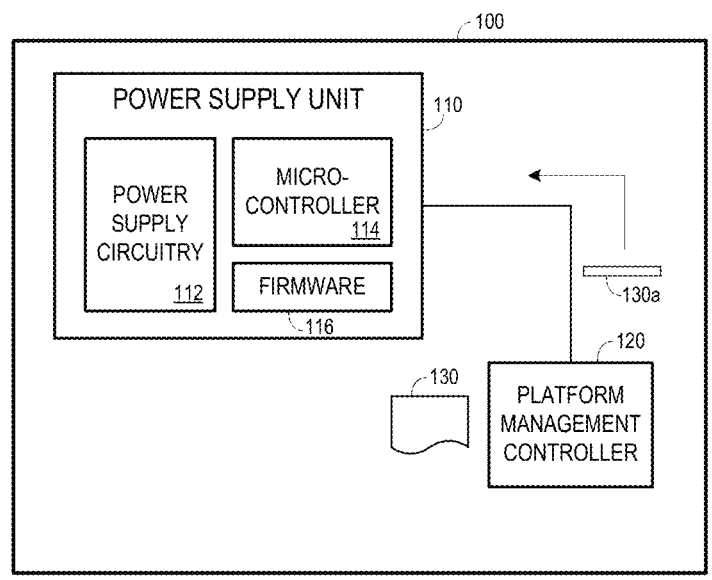
FIG. 1 is a block diagram of a platform according to some embodiments.

FIG. 1 illustrates platform 100 according to some embodiments. Platform 100 may comprise any computing platform supporting at least one management controller and one firmware-executing device. Platform 100 may comprise a desktop motherboard, a blade server, or any other suitable platform that is or becomes known. Platform 100 may include any number of other devices, peripherals, integrated circuits, discrete circuits, and mechanical elements (e.g., cooling elements and interconnects) as is known.

Platform 100 of FIG. 1 comprises platform management controller 120, which may comprise a Baseboard Management Controller (BMC) according to some embodiments. For example, a BMC may comprise a microcontroller embedded on a computer motherboard (e.g., a server motherboard) which manages the interface between system-management software and platform hardware. A BMC may monitor the physical state of a computer, network server or other hardware device and communicate with a system administrator (e.g., a data center manager) through an independent connection. Such a system administrator may remotely manage several platforms simultaneously via their BMCs.

Platform 100 also includes power supply unit (PSU) 110. PSU 110 includes power supply circuitry for providing power having desired characteristics to platform 100. Microcontroller 114 executes firmware 116 to control power supply circuitry 112. Embodiments are not limited to a single PSU per platform, or to the architecture of PSU 110.

Controller 120 communicates with PSU 110 over a communication bus provided by platform 100. According to some embodiments, the communication bus is an I²C bus and controller 120 is an I²C master. In addition to PSU 110 (and any other PSUs of platform 100), controller 120 may control I/O expanders, various sensors, EEPROMs, ADCs/DACs, disk drives, FPGAs, etc. As will be described below, embodiments may utilize such a common bus to facilitate efficient firmware updates of different types and/or versions of slave devices.

Briefly, a firmware update process according to some embodiments includes transmission of a portion 130a of a firmware image 130 from platform management controller 120 to PSU 110. Portion 130a may comprise a first line of a header of firmware image 130, but embodiments are not limited thereto. PSU 110 receives portion 130a and determines, based on the information of portion 130a, whether it should update firmware 116 with firmware image 130. The determination may be based on any number of factors, examples of which are discussed below.

If PSU 110 determines to update firmware 116 with firmware image 130, PSU 110 signals controller 120 to write the remainder of image 130 to PSU 110. If the transmission is successful, controller 120 signals PSU 110 to initiate a firmware update. PSU 110 executes the update and provides a status of the update to controller 120 in response to a subsequent query. Error handling according to some embodiments will be described below.

Figure 2:
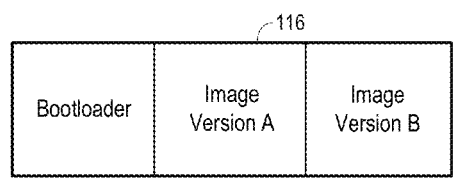
FIG. 2 illustrates a memory including firmware according to some embodiments.

FIG. 2 illustrates a memory storing firmware 116 according to some embodiments. As shown, firmware 116 includes a bootloader section, an image version A section and an image version B section. The bootloader section stores code for booting PSU 110 as is known in the art. The image version sections are used to store an active version of the firmware and an inactive version of the firmware. During the process described herein, microcontroller 114 may execute firmware from the active section (i.e., either image version A or image version B) while receiving firmware image 130 to the other, inactive section. Upon receiving an instruction to initiate a firmware update, microcontroller 114 operates to switch the active section to inactive and to designate the inactive section as active.

According to some embodiments, and in contrast to the conventional systems described above, PSU 110 identifies the inactive section and stores received firmware image 130 therein. Such operation reduces a need for controller 120 to communicate with PSU 110 to determine the inactive section and to instruct PSU 110 to write image 130 thereto.

Figure 3:
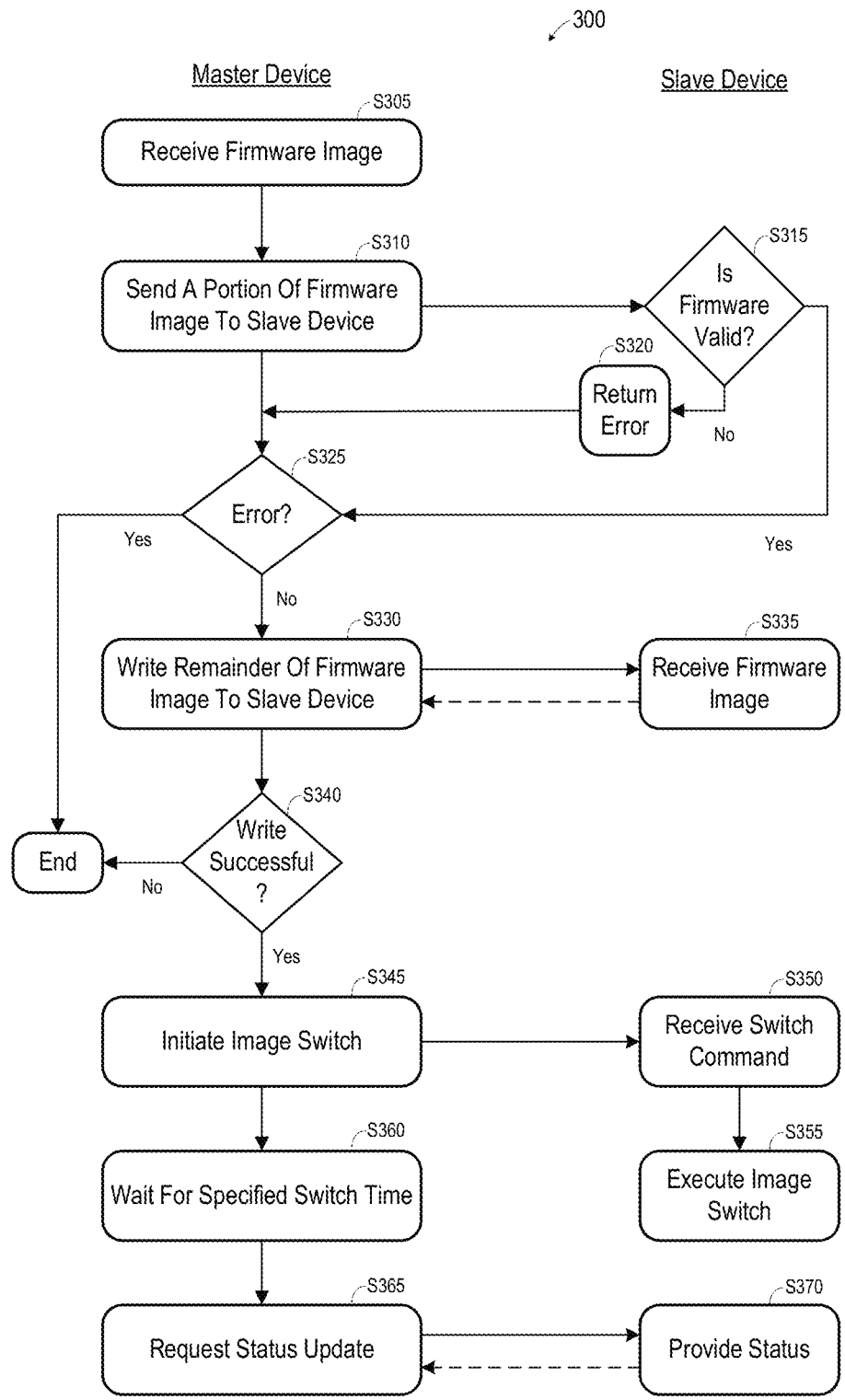
FIG. 3 is a flow diagram of a process to update firmware according to some embodiments.

FIG. 3 is a flow diagram of process 300 to perform a firmware update according to some embodiments. Process 300 and the other processes described herein may be performed using any suitable combination of hardware, software or manual means. Software program code embodying these processes may be executed by a master device and one or more slave devices as described herein, and may be stored in any non-transitory tangible medium, including a read-only memory, a volatile or non-volatile random access memory, a fixed disk, a CD, a DVD, a Flash drive, or a magnetic tape. Embodiments are not limited to the examples described below.

A firmware image is initially received by a master device at S305. With respect to the example of FIG. 1, controller 120 of platform 100 may receive firmware image 130 from a management utility executed by another computing system. Next, at S310, the master device sends a portion of the firmware image to a slave device. The portion may comprise the first line of a header of the firmware image, but embodiments are not limited thereto.

The portion may be sent over a dedicated or shared bus of a platform supporting the master device and the slave device. The portion may be addressed to the slave device, or may be available to any slave device residing on the bus.

The slave device receives the portion at S315 and determines whether the firmware associated with the portion is valid. The determination at S315 may include determinations of whether the firmware image corresponds to the slave device (e.g., does it correspond to the vendor and type of PSU 110?), whether the version of the firmware image is newer than the current version being executed by the slave device, and/or whether the firmware image is compatible with the hardware version of the slave device. Accordingly, the portion of the firmware sent to the slave device at S310 should include enough information to allow the slave device to make an accurate determination at S315. However, a larger portion size may diminish the time-saving benefits of some embodiments in comparison to a smaller portion size.

The slave device returns an error at S320 if the firmware is not valid. The error may specify a reason for the error. According to process 300, flow terminates (i.e., the firmware update is aborted) after the master device receives the error at S325. In some embodiments, upon receiving an error at S325, the master device re-tries sending the portion of the firmware at S310. Flow may then terminate after a predetermined number (e.g., 3) of unsuccessful re-tries.

Flow proceeds from S325 to S330 if the slave device finds the firmware valid at S315. The remainder of the firmware image is written to the slave device at S330. The firmware image is received by the slave device at S335. Writing the remainder of the firmware image may comprise sending a portion (e.g., a line) of the firmware image to the slave device, receiving an acknowledgement from the slave device, sending a next line, and continuing in this manner until the sending is complete.

The master device determines whether the write was successful at S340. If not, process 300 terminates. As described above, the write may be re-tried a predetermined number of times before terminating process 300.

After successfully writing the firmware image to the slave device, the master device initiates a firmware image switch at S345. The slave device receives the switch command at S350 and executes the image switch at S355. As described above, the slave device may store the received firmware image in an inactive section of its firmware memory. S355 may therefore comprise stopping execution of the firmware located in the currently-active section of the firmware memory, setting the currently-active section to inactive, and setting the currently-inactive section, which holds the newly-received firmware image, to active.

The master device waits for the image switch to occur at S360. The waiting time may be a preconfigured value stored in a hardware register of platform 100. The waiting time may correspond to an estimated time required by the slave device to execute an image switch and be ready to accept subsequent communications.

Once the waiting time has elapsed, the master device requests a status update from the slave device at S365. The slave device receives the request and responds at S370. If the response indicates that the switch was successful and the slave device is operating normally, process 300 may terminate. Process 300 may also terminate if an error occurred. In some embodiments, process 300 is re-executed if an error is returned at S370, and continues to be re-executed until the returned status is good or until process 300 has been re-executed a predetermined number of times (e.g., 3).

Figure 4:
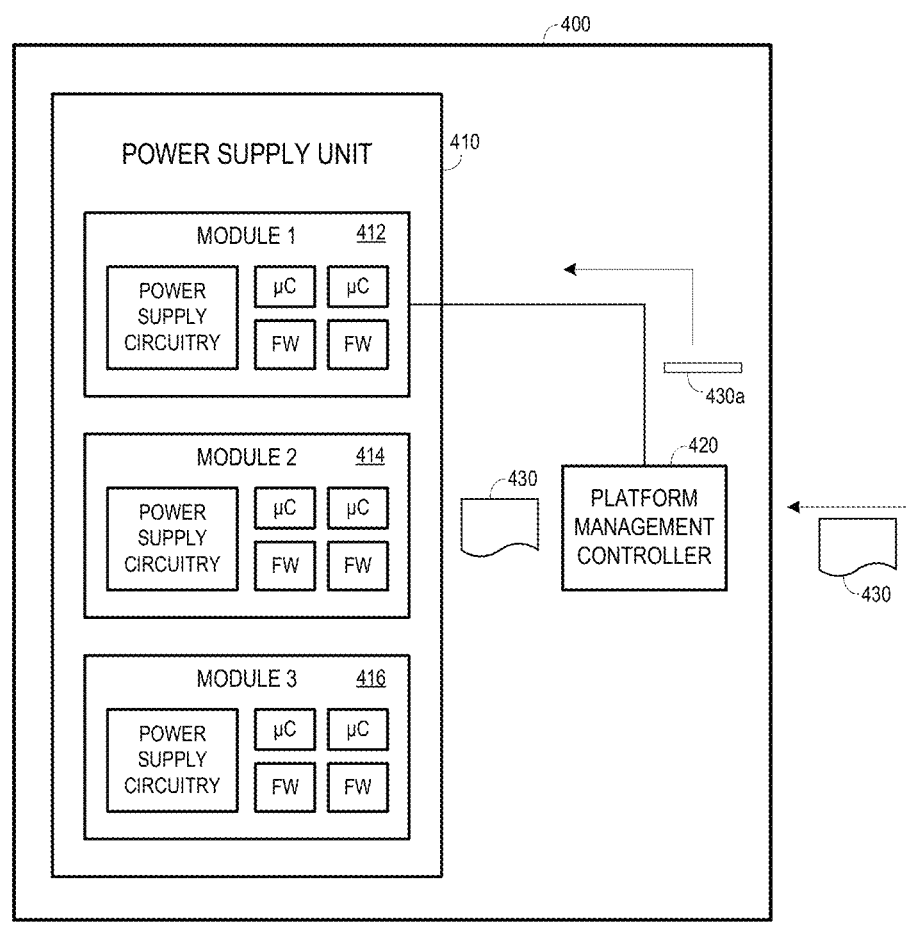
FIG. 4 is a block diagram of a platform including a multi-module power supply unit according to some embodiments.

FIG. 4 illustrates platform 400 according to some embodiments. Platform 400 includes PSU 410 and platform management controller 420. Platform 400 may include many other components, including additional slave devices of controller 420, as is known in the art.

PSU 410 includes three modules 412, 414 and 416. Each module includes power supply circuitry and two microcontrollers, each having associated firmware. The two microcontrollers of a given module 412, 414 and 416 may comprise a primary microcontroller and a secondary microcontroller. Embodiments are not limited to any particular number of modules or microcontrollers per module.

According to some embodiments, one of the microcontrollers of PSU 410 is a master microcontroller. The master microcontroller communicates with controller 420 to execute the steps of process 300 associated with the slave device. Upon receiving a command to initiate an image switch at S350, the master microcontroller may execute the image switch at S355 by updating each of the microcontrollers of each of modules 412, 414 and 416 in sequence. The master microcontroller may also determine an overall status after the switch and provide the status to the master device at S370.

Figure 5:
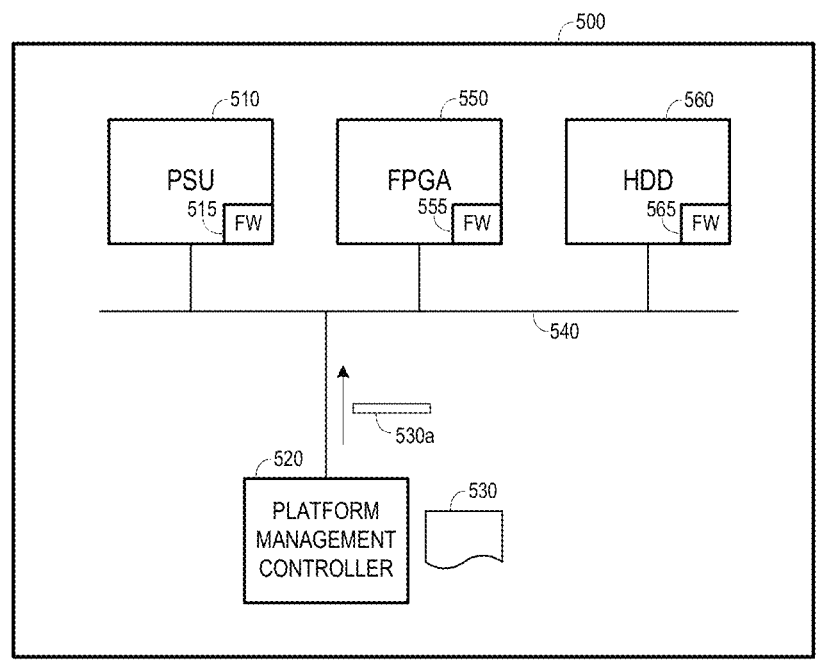
FIG. 5 is a block diagram of a platform including several types of firmware-executing devices according to some embodiments.

FIG. 5 illustrates platform 500 according to some embodiments. Platform 500 includes PSU 510, platform management controller 520, FPGA 550 and hard disk drive 560. Each of devices 510, 550 and 560 may comprise a slave device of controller 520, and each of devices 510, 550 and 560 executes its own respective firmware 515, 555 and 565. Some embodiments may operate to facilitate firmware updates of disparate devices of a same platform such as platform 500.

Figure 6:
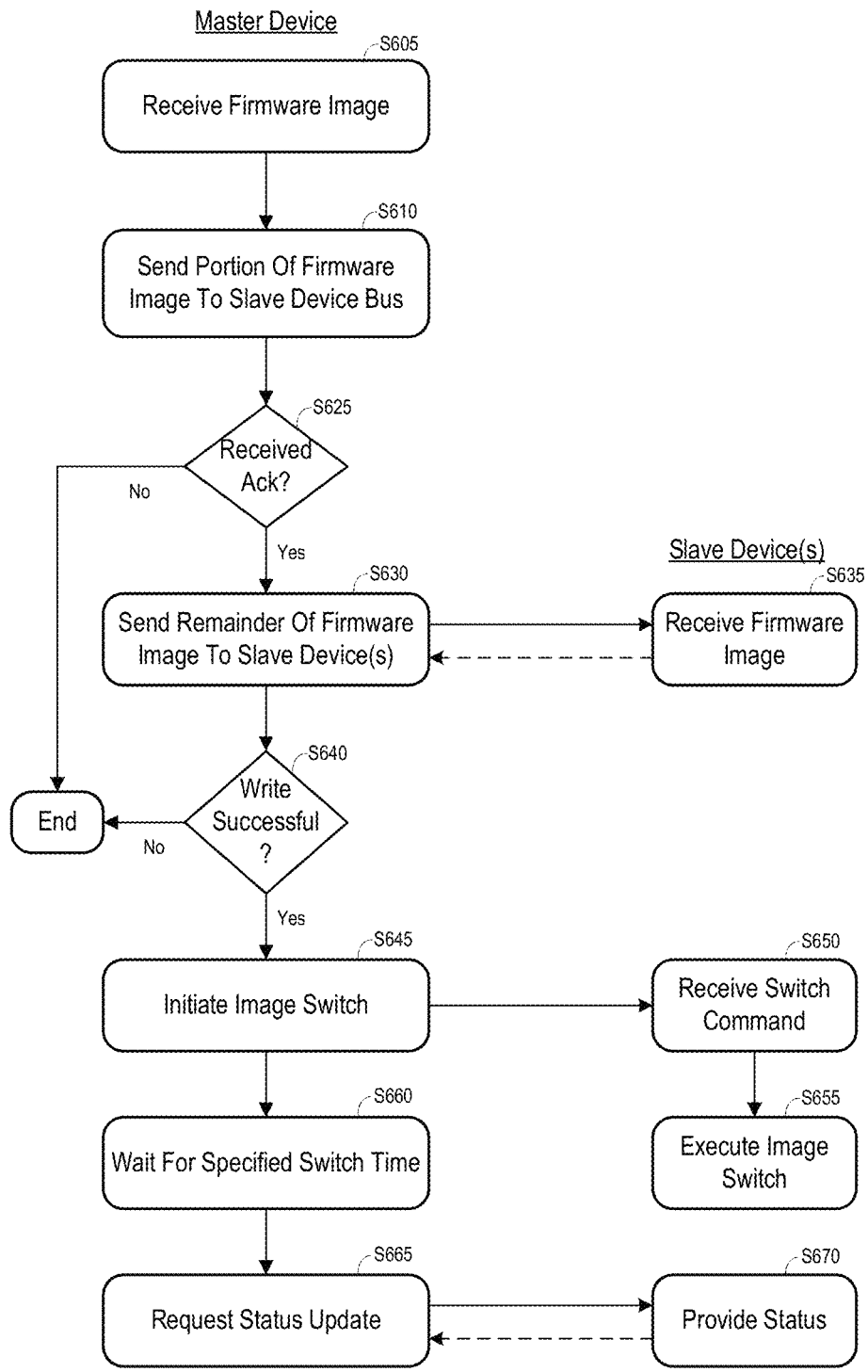
FIG. 6 is a flow diagram of a process to update firmware of one or more devices according to some embodiments.

FIG. 6 is a flow diagram of process 600 to update firmware of disparate devices according to some embodiments. At S605, a master device receives a firmware image as described above with respect to S305. Next, at S610, the master device sends a portion of the firmware image to a slave device bus. In contrast to some embodiments of S310, the portion of the firmware image (e.g., the first line of the image header 530a) is not sent to a particular slave device but is instead placed on the bus and available to all slave devices.

It is then assumed that one or more slave devices on the bus receives the portion and individually determines whether the associated firmware image (e.g., firmware image 530) is valid for itself as described with respect to S315. If so, the slave device sends an acknowledgement to the master device.

Accordingly, the master device waits for such acknowledgements at S625. Flow terminates if none are received within a given time period. As before, S610 may be retried a certain number of times before the master device aborts process 600.

If one or more acknowledgements are received, flow proceeds from S630 through S670 as described above with respect to S330 through S370, for each slave device from which an acknowledgement was received. The master device therefore executes S630, S640, S645, S660 and S665 in parallel for each slave device from which an acknowledgement was received.

According to some embodiments of process 600, the master device is not required to determine which one or more slave devices should be updated with a received firmware image. Modifications to potential slave devices do not require modifications to the master device, as long as the modified slave devices support the simple protocol described herein.

Figure 7:
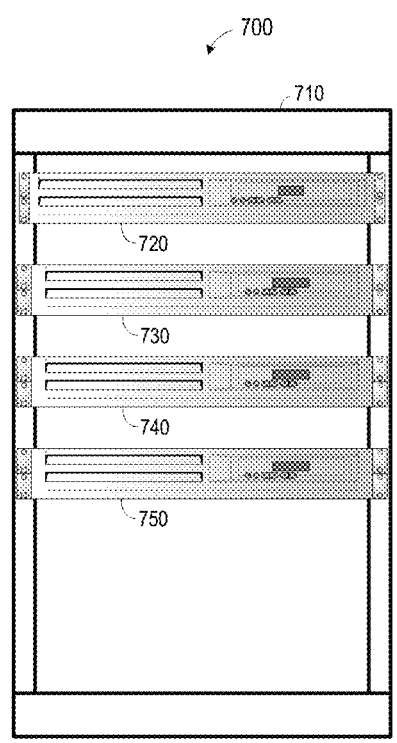
FIG. 7 illustrates a rack including servers to receive firmware updates according to some embodiments.

FIG. 7 illustrates rack system 700 according to some embodiments. Rack system 700 includes rack 710 and four servers 720-750 mounted thereon. According to some embodiments, server 720 is a rack manager and servers 730-750 are managed by rack manager 720.

Rack manager 720 may transmit a same firmware image to a management controller of each of servers 730-750. The management controller may then operate as described above to update one or more slave devices of each of servers 730-750 which are associated with the firmware. Such an embodiment reduces a need for rack manager 720 to ensure compatibility of the firmware image with the specific hardware of servers 730-750. For example, if an updated firmware image is available for a known device, rack manager may simply transmit the firmware image to a management controller of each of servers 730-750 without checking whether the device is actually present in each of servers 730, since any firmware incompatibilities will waste significantly fewer resources than in the case of conventional firmware update processes.

Figure 8:
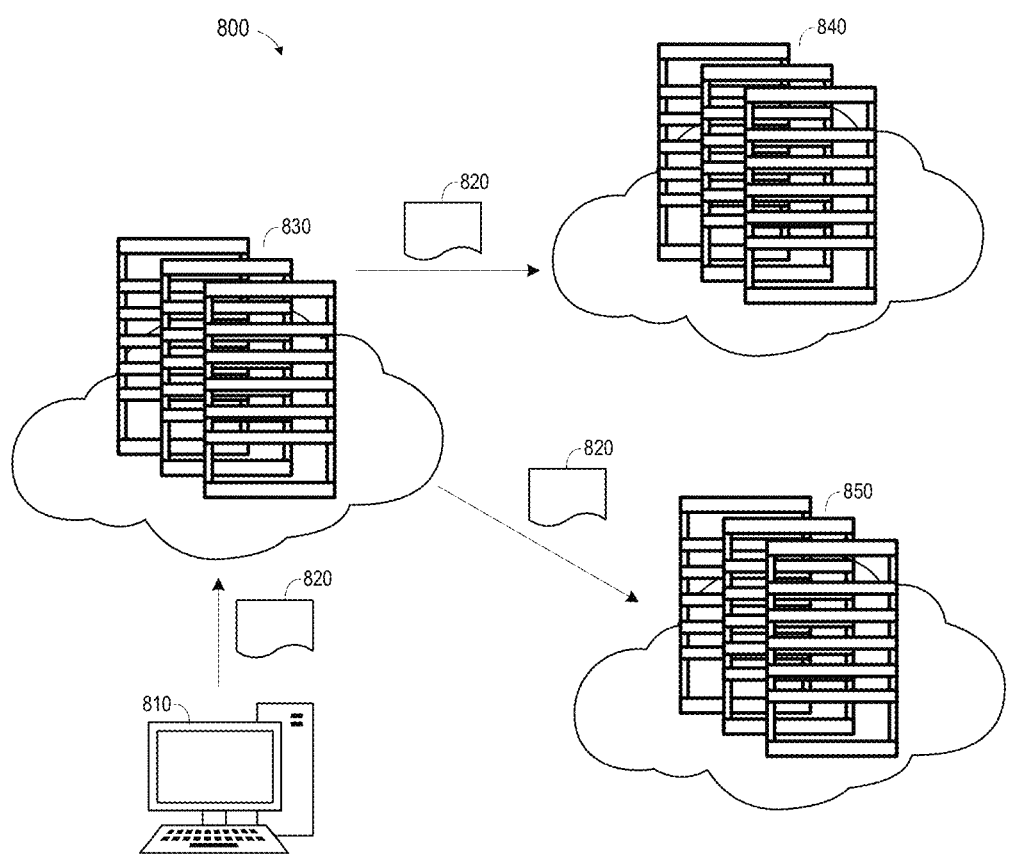
FIG. 8 illustrates a firmware update within a cloud-based architecture according to some embodiments.

FIG. 8 illustrates cloud architecture 800 according to some embodiments. Architecture 800 includes data center manager service 830, data center 840 and data center 850. Data centers 840 and 850 may provide any functionality that is or becomes known.

According to FIG. 8, client system 810 provides firmware image 820 to data center manager 830. Data center manager 830, in turn, provides firmware image 830 to each of data centers 840 and 850. Each rack manager of data centers 840 and 850 may then distribute firmware image 820 to each of its servers as described above with respect to FIG. 7.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A system comprising:
 a power supply unit comprising:
  a power supply unit memory storing firmware; and
  a processing unit to execute the firmware; and
 a platform management controller to transmit a first portion of a firmware image to the power supply unit, the first portion of the firmware image including information identifying a version of the firmware image,
 wherein the power supply unit is to:
 receive the first portion of the firmware image;
 determine, based on the first portion of the firmware image, whether the version of the firmware image is compatible with hardware of the power supply unit and newer than a version of the firmware stored in the power supply unit memory; and
 if it is determined by the power supply unit that the version of the firmware image is compatible with hardware of the power supply unit and newer than a version of the firmware stored in the power supply unit memory, transmit an acknowledgement signal from the power supply unit to the platform management controller, receive a second portion of the firmware image from the platform management controller, and update the firmware stored in the power supply unit memory based on the first portion and the second portion of the firmware image.

2. A system according to claim 1, the platform management controller further to:
receive the acknowledgement signal from the power supply unit; and
in response to the acknowledgement signal, transmit the second portion of the firmware image to the power supply unit.

3. A system according to claim 2, wherein the platform management controller is a baseboard management controller, and the first portion of the firmware image is transmitted over an I$^2$C bus.

4. A system according to claim 2, wherein the power supply unit receives the first portion of the firmware image from the platform management controller over a communication bus, the system further comprising:
a second power supply unit to receive the first portion of the firmware image from the platform management controller over the communication bus.

5. A system according to claim 1, wherein the first portion of the firmware image is a first line of a header of the firmware image.

6. A system according to claim 1, the power supply unit further to transmit an error code if it is determined that the version of the firmware image is not compatible with hardware of the power supply unit and newer than the version of the firmware stored in the memory.

7. A system according to claim 1, wherein determining that the version of the firmware image is compatible with hardware of the power supply unit and newer than a version of the firmware stored in the power supply unit memory comprises determining a device associated with the firmware image based on the first portion of the firmware image.

8. A method for a platform management controller and a power supply unit of a server, comprising:
receiving, at the platform management controller and from a rack manager server, a first portion of a firmware image, the first portion of the firmware image including information identifying a version of the firmware image;
transmitting the first portion of the firmware image from the platform management controller to the power supply unit;
determining, by the power supply unit and based on the first portion of the firmware image, whether the version of the firmware image is compatible with hardware of the power supply unit and newer than a version of firmware stored in a power supply unit memory of the power supply unit; and
if it is determined by the power supply unit that the version of the firmware image is compatible with hardware of the power supply unit and newer than a version of the firmware stored in the power supply unit memory;
transmitting an acknowledgement signal from the power supply unit to the platform management controller;
receiving a second portion of the firmware image from the platform management controller; and
updating the firmware stored in the power supply unit memory based on the first portion and the second portion of the firmware image.

9. A method according to claim 8, wherein the first portion of the firmware image is transmitted over an I$^2$C bus from a baseboard management controller to a power supply unit.

10. A method according to claim 8, wherein the first portion of the firmware image is a first line of a header of the firmware image.

11. A method according to claim 8, further comprising:
transmitting an error code if it is determined by the power supply unit that the version of the firmware image is not compatible with hardware of the power supply unit and newer than a version of the firmware stored in the power supply unit memory.

12. A method according to claim 8, wherein determining that the version of the firmware image is compatible with hardware of the power supply unit and newer than the version of firmware stored in the power supply unit memory comprises determining a device associated with the firmware image based on the first portion of the firmware image.

13. A system comprising:
a rack manager server; and
a plurality of servers in communication with the rack manager server, each of the plurality of servers comprising a platform management controller and a respective power supply unit,
the rack manager server to transmit a firmware image to each platform management controller,
each platform management controller to transmit a first portion of the firmware image to its respective power supply unit, the first portion including information identifying a version of the firmware image, and
each power supply unit to determine, based on the first portion, whether the version of the firmware image is compatible with hardware of the power supply unit and newer than a version of the firmware stored in a respective power supply unit memory, and, if it is determined that the version of the firmware image is compatible with hardware of the power supply unit and newer than the version of the firmware stored in the respective power supply unit memory, to transmit an acknowledgement signal to its respective platform management controller, to receive a second portion of the firmware image from its respective platform management controller, and to update the firmware stored in the respective power supply unit memory based on the first portion and the second portion of the firmware image.

14. A system according to claim 13, wherein the first portion of the firmware image is a first line of a header of the firmware image.

15. A system according to claim 13, each power supply unit to transmit an error code to its respective platform management controller if it is determined that the version of the firmware image is not compatible with hardware of the power supply unit and newer than the version of the firmware stored in the respective power supply unit memory.

16. A system according to claim 13, wherein determining that the version of the firmware image is compatible with hardware of the power supply unit and newer than the version of firmware stored in the respective power supply unit memory comprises determining a device associated with the firmware image based on the first portion of the firmware image.

* * * * *